United States Patent

Kelly et al.

(10) Patent No.: US 7,790,101 B2
(45) Date of Patent: Sep. 7, 2010

(54) ARTICLES FOR USE WITH HIGHLY REACTIVE ALLOYS

(75) Inventors: Thomas Joseph Kelly, Cincinnati, OH (US); Michael James Weimer, Loveland, OH (US); Bernard Patrick Bewlay, Schenectady, NY (US); Michael Francis Xavier Gigliotti, Jr., Glenville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/646,004

(22) Filed: Dec. 27, 2006

(65) Prior Publication Data

US 2008/0156453 A1 Jul. 3, 2008

(51) Int. Cl.
C22B 4/08 (2006.01)
B22D 41/02 (2006.01)
F27B 14/10 (2006.01)

(52) U.S. Cl. .................... 266/275; 164/335; 432/264; 432/265

(58) Field of Classification Search .............. 164/335, 164/72, 267; 266/44, 282, 275; 75/10.18; 432/262, 264, 265
See application file for complete search history.

(56) References Cited

U.S. PATENT DOCUMENTS

| 3,245,674 A | * | 4/1966 | Baer et al. ............ 266/275 |
| 3,660,075 A | * | 5/1972 | Harbur et al. .......... 75/10.14 |
| 3,734,480 A | * | 5/1973 | Zanis et al. ............ 266/275 |
| 4,028,096 A | * | 6/1977 | Banker et al. ............ 75/398 |
| 5,443,892 A | * | 8/1995 | Holcombe et al. ........ 428/216 |
| 5,476,679 A | | 12/1995 | Lewis et al. |
| 6,986,381 B2 | * | 1/2006 | Ray et al. ............ 164/529 |
| 7,582,133 B2 | * | 9/2009 | Kelly et al. ............ 75/10.18 |

FOREIGN PATENT DOCUMENTS

| CN | 1060683 | | 4/1992 |
| EP | 0301763 | | 7/1988 |
| EP | 0529594 | A1 | 8/1992 |
| GB | 783411 | | 9/1957 |
| JP | 54157780 | | 12/1979 |
| JP | 06 009290 | | 1/1994 |
| JP | 06 179930 | | 6/1994 |
| JP | 070 89789 | | 4/1995 |
| JP | 11-116399 | A * | 4/1999 |
| JP | 11116399 | * | 4/1999 |
| WO | WO 00/44959 | A1 | 8/2000 |

OTHER PUBLICATIONS

EP Search Report, dated Mar. 14, 2008 for Application No. 07122388.7.
EP Search Report, dated Feb. 8, 2008 for Application No. 07122372.1.
Database WPI Week, dated Oct. 3, 2008, 198513, XP002471361.

* cited by examiner

*Primary Examiner*—Kevin P Kerns
(74) *Attorney, Agent, or Firm*—Bryn T. Lorentz; William Scott Andes; General Electric Company

(57) ABSTRACT

Articles for use with highly reactive alloys that include a graphite crucible having an interior, and at least a first protective layer applied to the interior of the graphite crucible in which the graphite crucible having the first protective layer is used for melting highly reactive alloys.

6 Claims, 2 Drawing Sheets

ARTICLES FOR USE WITH HIGHLY REACTIVE ALLOYS

TECHNICAL FIELD

Embodiments described herein generally relate to articles for use with highly reactive alloys. More particularly, embodiments herein generally describe graphite crucibles that can be used to melt highly reactive alloys such as titanium aluminide.

BACKGROUND OF THE INVENTION

Induction melting generally involves heating a metal in a crucible made from a non-conductive refractory alloy oxide until the charge of metal within the crucible is melted down to liquid form. When melting highly reactive metals such as titanium or titanium alloys, vacuum induction melting using cold wall or graphite crucibles is typically employed.

However, difficulties can arise when melting these highly reactive alloys due to the reactivity of the elements in the alloy at the temperatures needed for melting to occur. As previously mentioned, while most induction melting systems use refractory alloy oxides for crucibles in the induction furnace, alloys such as titanium aluminide (TiAl) are so highly reactive that they can attack the refractory alloys present in the crucible and contaminate the titanium alloy. For example, ceramic crucibles are typically avoided because the highly reactive alloys can break down the crucible and contaminate the titanium alloy with oxygen. Similarly, if graphite crucibles are employed, both the titanium and the aluminide can dissolve large quantities of carbon from the crucible into the titanium alloy, thereby resulting in contamination. Such contamination results in the loss of mechanical properties of the titanium alloy.

Moreover, while cold crucible melting offers metallurgical advantages for the processing of the highly reactive alloys described previously, it also has a number of technical and economic limitations including low superheat, yield losses due to skull formation, high power requirements and a limited melt capacity. These limitations can restrict its commercial viability.

Accordingly, there remains a need for articles for use in melting highly reactive alloys that are less susceptible to contamination and pose fewer technical and economic limitations than current applications.

BRIEF DESCRIPTION OF THE INVENTION

Embodiments herein generally relate to articles for use with highly reactive alloys comprising a graphite crucible having an interior, and at least a first protective layer applied to the interior of the graphite crucible.

Embodiments herein also generally relate to articles for use with highly reactive alloys comprising a graphite crucible having an interior, at least a first protective layer applied to the interior of the graphite crucible, and at least a second protective layer applied to the first protective layer.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

DETAILED DESCRIPTION OF THE INVENTION

Embodiments described herein generally relate to articles having at least one protective layer for use with highly reactive alloys. In particular, embodiments herein relate to graphite crucibles having at least one protective layer comprising either a foil liner or a carbide coating as set forth below.

Figure 1:
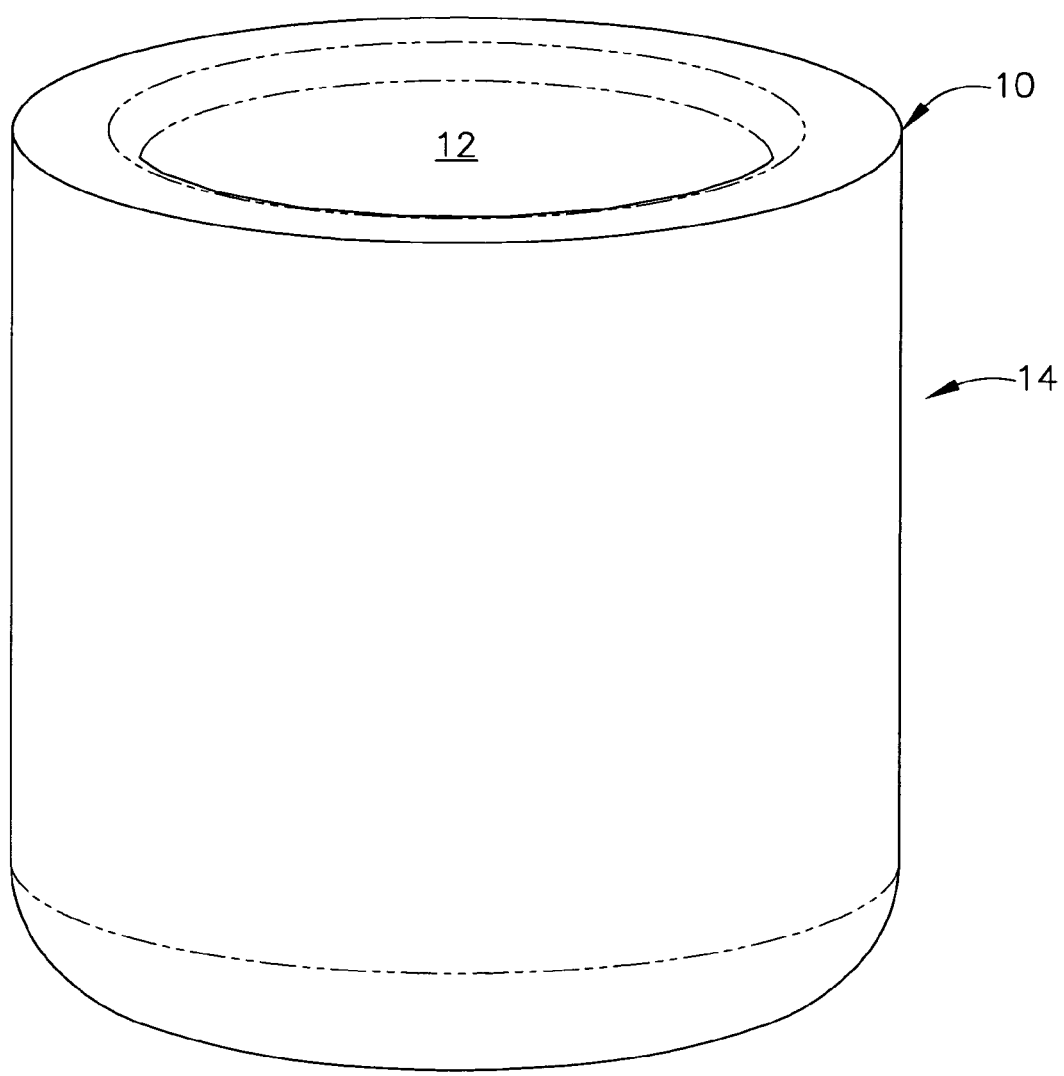
FIG. 1 is a schematic perspective view of one embodiment of a crucible in accordance with the description herein.

Turning to the figures, FIG. 1 illustrates one embodiment of an acceptable graphite crucible 10 for use herein. Graphite crucible 10 may be any graphite crucible known to those skilled in the art suitable for induction melting. Graphite crucible 10 can have an interior 12 for containing the alloy to be melted and an exterior 14.

Figure 2:
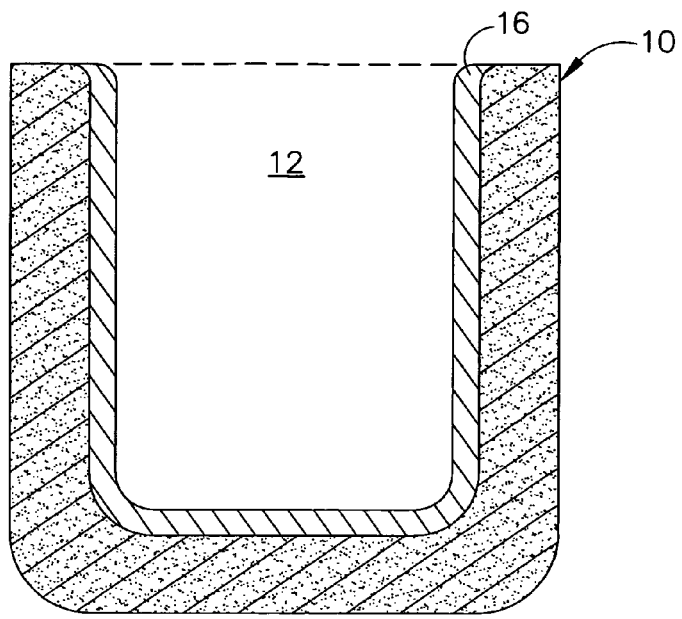
FIG. 2 is a schematic cross-sectional view of one embodiment of a crucible having at least one protective layer in accordance with the description herein.
Figure 3:
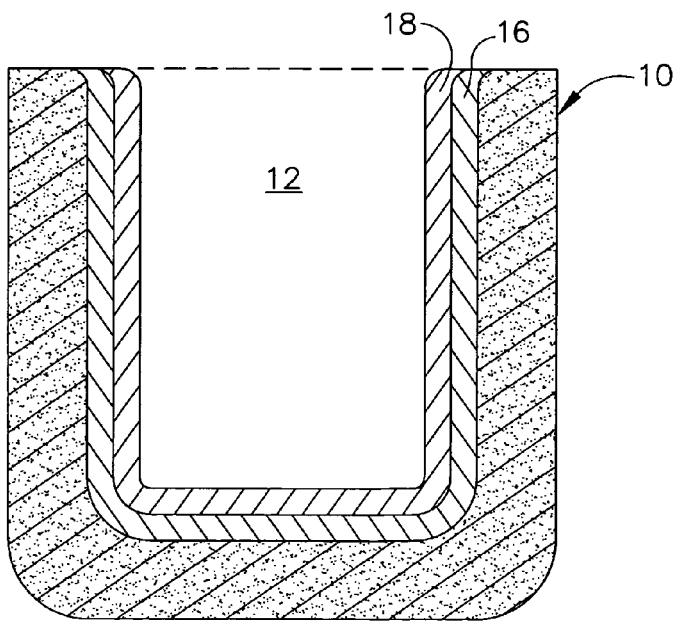
FIG. 3 is a schematic cross-sectional view of one embodiment of a crucible having at least a first and second protective layer in accordance with the description herein.

Graphite crucible 10 may be used to melt highly reactive alloys such as, for example, those including the elements titanium, hafnium, iridium or rhenium, as well as advanced alloys including niobium, for example niobium silicide, or nickel, for example nickel aluminide. In one embodiment, the highly reactive alloy may comprise titanium aluminide (TiAl), and in particular a TiAl alloy containing a high melting point alloy elements such as niobium, tantalum, tungsten, and molybdenum. The previously mentioned titanium alloys may generally comprise from about 61 wt % to about 71 wt % titanium, from about 25 wt % to about 35 wt % aluminum, with the remainder of the alloy comprising the high melting point alloy elements as well as small amounts of any of carbon, boron, chromium, silicon, manganese, and combinations thereof. As used herein, "highly reactive alloys" refers to alloys having a high free energy of absorption for oxygen in the liquid phase. In contrast to the previously described carbon contamination issues that can arise when using graphite crucibles to melt such highly reactive alloys, embodiments herein can reduce the occurrence of contamination of the melted alloy because of the presence of at least a first protective layer 16 applied to interior 12 of crucible 10, as shown generally in FIG. 2. More particularly, the presence of first protective layer can reduce carbon contamination of the melted alloy to such a degree that the melted alloy may comprise up to about 0.015 wt % carbon. This includes both any carbon that may be present in the highly reactive alloy and any carbon resulting from the reaction of the graphite crucible.

First protective layer 16 may comprise a foil liner or a carbide coating. More specifically, in one embodiment, first protective layer 16 can comprise a foil liner fabricated from up to about 100% of at least one of the previously referenced high melting point alloy elements, which can include niobium, tantalum, tungsten, and molybdenum. The foil liner may be press molded into interior 12 of crucible 10 or it may be preformed and dropped into place. Once in position, the foil liner may be held in place by mechanical deformation about the crucible. While the foil liner may have any desired thickness, in one embodiment, the foil liner can have a thickness of from about 0.005 mm to about 2 mm, in another embodiment from about 0.005 mm to about 1.5 mm, and in one embodiment about 0.005 mm to about 1 mm. In yet another embodiment, the foil liner can have a thickness of about 0.025 mm. At this point, the desired highly reactive alloy, such as TiAl, may be placed into the foil lined crucible and melted, generally at a temperature of from about 1370° C. (about 2500° F.) to about 1700° C. (about 3100° F.).

As previously described, the resulting melted alloy can contain a reduced amount of carbon contaminates when compared to the amount of contaminates present in alloys melted in non-lined crucibles. This is because the foil liner can protect the melted alloy against contamination in two ways. First, the foil liner can serve as a barrier to contamination by helping to prevent the melted alloy from contacting the graphite crucible in the first instance. Second, the foil liner can serve as a sacrificial layer such that if a portion of the foil liner melts from exposure to the high temperatures, it will not contaminate the melted alloy since the foil liner is comprised of at least one of the high melting point alloy elements contained in the melted alloy itself. In general, if the foil liner melts upon exposure to the high temperature, it will result in about less than or equal to the specification limit, +/−0.1 wt % of niobium, tantalum, tungsten or molybdenum being added to the melted alloy in addition to that initially present therein. Those skilled in the art will understand that high melting point alloy element selected to make the foil liner should be the same as the high melting point alloy element having the highest melting point present in the highly reactive alloy being melted.

In another embodiment, first protective layer 16 can comprise a carbide coating formed by applying at least one of the previously referenced high melting point alloy elements, that is niobium, tantalum, tungsten, and molybdenum, to interior 12 of crucible 10 followed by heat treatment thereof. More specifically, the selected high melting point alloy element(s) may be applied to interior 12 of crucible 10 using any common method known to those skilled in the art, such as vapor deposition or air plasma spray for example. Once applied, the high melting point alloy element(s) can be heat treated in a carborizing atmosphere by using vacuum heat treatment or by heating the crucible containing the high melting point alloy element in a reducing atmosphere to generate a carbide coating on interior 12 of crucible 10. When a highly reactive alloy, such as TiAl, is melted in crucible 10, the resulting melted alloy can again contain relatively fewer contaminates compared to melted alloys prepared in non-coated crucibles. In one embodiment, the amount of carbon contamination resulting from the reaction of the highly reactive alloy with the graphite crucible can be reduced by at least about 50%, and in another embodiment from about 60% to about 99%, and in yet another embodiment from about 75% to about 99% when compared to the contamination present in non-coated crucibles. This reduction in contamination can be attributed to reduced contact between the highly reactive alloy and the graphite crucible.

In yet another embodiment, graphite crucible 10 may comprise at least first protective layer 16 and a second protective layer 18. More specifically, if first protective layer 16 comprises a foil liner, then second protective layer 18 can comprise a carbide coating. Alternately, if first protective layer 16 comprises a carbide coating, then second protective layer 18 may comprise a foil layer. Regardless of which of first protective layer 16 or second protective layer 18 is the foil layer or carbide coating, both can be applied in the manner described previously.

It may be desirable to utilize both first protective layer 16 and second protective layer 18 because, in addition to the previously described benefits provided by each independently, together the two protective layers can help to extend the use life of crucible 10.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An article comprising:
   a graphite crucible having an interior;
   a first protective layer comprising a foil liner applied to the interior of the graphite crucible, the foil liner comprising about 100% of at least one of a high melting point alloy element selected from the group consisting of niobium, tantalum, tungsten, and molybdenum; and
   a second protective layer comprising a carbide coating applied to the first protective layer
   wherein the first and second protective layers make the crucible capable of containing a molten titanium aluminide alloy having a melting point of from about 1370° C. to about 1700° C.

2. The article of claim 1 wherein the carbide coating comprises the at least one high melting point alloy element heat treated in a carborizing atmosphere.

3. The article of claim 2 wherein the foil liner comprises a thickness of from about 0.005 mm to about 2 mm.

4. An article comprising:
   a graphite crucible having an interior;
   a first protective layer comprising a carbide coating applied to the interior of the graphite crucible; and
   a second protective layer comprising a foil liner applied to the first protective layer, the foil liner comprising about 100% of at least one of a high melting point alloy element selected from the group consisting of niobium, tantalum, tungsten, and molybdenum
   wherein the first and second protective layers make the crucible capable of containing a molten titanium aluminide alloy having a melting point of from about 1370° C. to about 1700° C.

5. The article of claim 4 wherein the carbide coating comprises the at least one high melting point alloy element heat treated in a carborizing atmosphere.

6. The article of claim 5 wherein the foil liner comprises a thickness of from about 0.005 mm to about 2 mm.

* * * * *